Aug. 2, 1955 N. J. BROWN 2,714,448

CONTAINER COMBINED WITH DETACHABLE PHONOGRAPH
RECORD AND STEREOSCOPIC DEVICE
Filed March 22, 1954

INVENTOR.
Nathan J. Brown
BY.
B. Gordon Allen.
Atty.

United States Patent Office 2,714,448
Patented Aug. 2, 1955

2,714,448

CONTAINER COMBINED WITH DETACHABLE PHONOGRAPH RECORD AND STEREOSCOPIC DEVICE

Nathan J. Brown, Barrington, Ill.

Application March 22, 1954, Serial No. 417,540

1 Claim. (Cl. 206—47)

This invention relates to containers and more particularly to a container embodying an advertising premium feature to stimulate sale of the commodity in the container.

A primary object of the invention is to devise such a container which is economical to manufacture, which is sturdy in construction and which has excellent eye appeal, particularly for children.

A more specific object of the invention is to devise a container having a disc at least partially defining a panel thereof, the outer surface of the disc having a picture thereon and the inner surface of the disc having a recording thereon.

Another object of the invention is to correlate the subject-matters of the picture and recording.

A further object of the invention is to form the disc as an integral part of the container panel.

Still another object of the invention is to define the disc by perforations through the panel.

Yet another object of the invention is to perforate the disc to define a center hole which may be punched therethrough by the user after the disc has been removed from the container. This novel feature avoids the necessity of an unsightly hole in the picture prior to opening of the container.

A different object of the invention is to form the picture as a component of a pattern on the outside of the container panel.

Still another object of the invention is to provide a picture which is stereoscopic in character and to mount a pair of suitably polarized eyeglasses either inside or outside the container for the purpose of viewing the picture.

The foregoing and other objects and advantages of the invention will become apparent from a consideration of the following specification and the accompanying drawings, wherein.

Figures 1, 2:
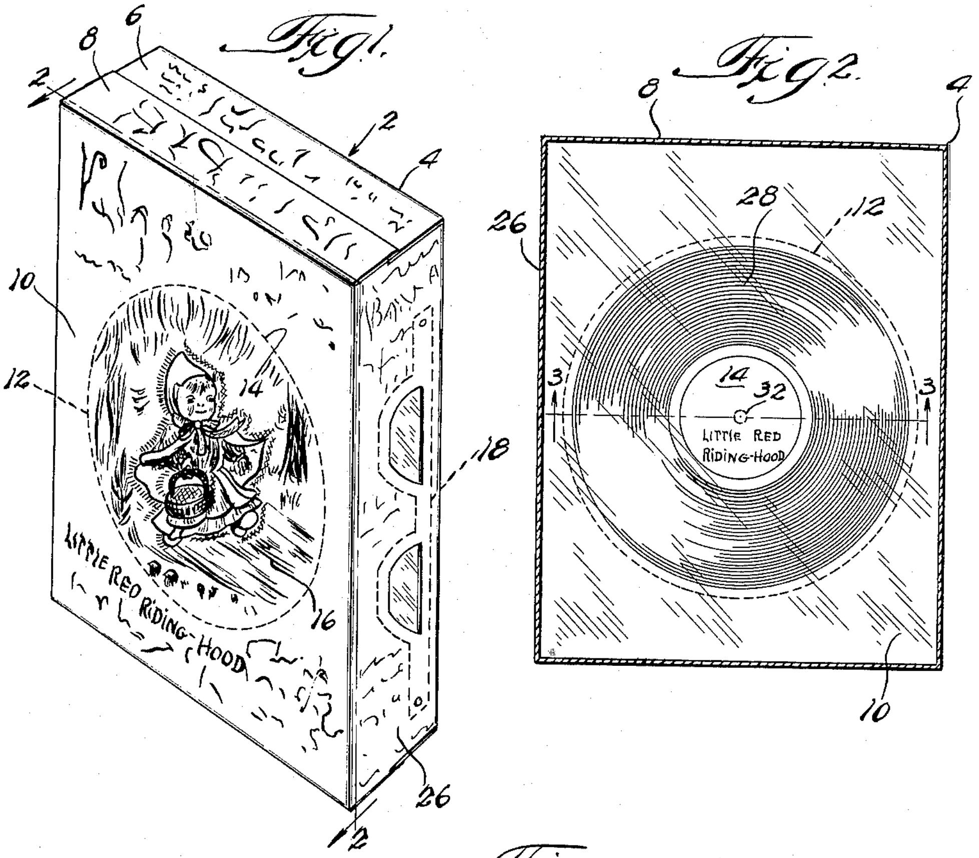
Figure 1 is a perspective view of a container assembly embodying the invention.
Figure 2 is a sectional view on line 2—2 of Figure 1.
Figure 3:
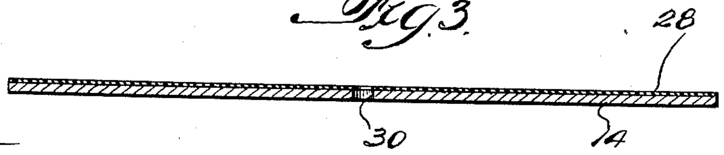
Figure 3 is a sectional view on line 3—3 of Figure 2.
Figure 4:
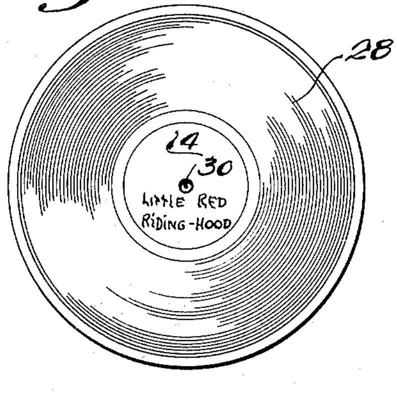
Figure 4 is a plan view of the disc after removal thereof from the container panel.
Figure 5:
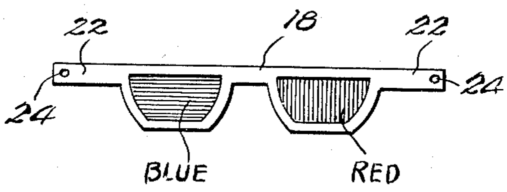
Figure 5 is a side elevational view of the eyeglasses illustrated in Figure 1.

Describing the invention in detail, the novel container assembly generally designated 2 (Figure 1) comprises a container or box which may contain any desired commodity such as, for example, a nationally advertised cereal.

The top of the box may be formed with the usual flaps 6 and 8 which may be opened to afford access to the contents of the box, and the front panel or wall 10 of the box is preferably perforated, as at 12, to define a disc 14, which is preferably round but may be of any desired configuration.

The outside surface of the disc comprises a picture 16 thereon which in the illustrated embodiment of the invention is a fanciful pictorial representation of the well-known fairy tale, Little Red Riding Hood. This title also appears on the front wall 10 of the box as illustrated, or in any other desired position to identify the picture and also to afford room for prominent display of the name of the manufacturer whose commodity is marketed in the box.

It may be noted that the picture 16 is preferably stereoscopic in character so that the picture, when viewed through properly colored eye-glasses, appears to have three-dimensional characteristics. A pair of such glasses are illustrated at 18, and it may be noted that the ends thereof are provided with flat straps 22 perforated as at 24 for convenient attachment to a side wall 26 of the box 4, as illustrated in Figure 1.

It may be noted that the eyeglasses 18 may be mounted inside the box, as illustrated, or may be mounted on the outer surface of the side wall 26, so that the picture can be viewed before the container is opened.

The perforations 24 also afford convenient connection for a string or elastic band (not shown) which may be supplied with the glasses for the purpose of attaching to the wearer's head.

The inside of the disc 14 is preferably provided with a conventional recording 28 of the fairy tale which is illustrated by the picture 16. Thus, when the disc is removed from the front panel by breaking the perforated portion thereof, the disc may be placed, picture side down, on the turntable of a conventional phonograph (not shown) to enable the listener to hear the fairy tale which is depicted by picture 16.

The disc 14 may be provided with a suitable opening 30 for the center stem (not shown) of the phonograph, or, if desired, the opening 32 may be defined by perforations, as shown in Fig. 2, so that the opening may be formed by the user after the disc has been removed from the front panel 10 of the box.

Thus it will be understood that I have devised a novel container assembly in which a panel of the container is perforated to define a disc having a picture on one side thereof and having a recording on the other side thereof, the subject-matter of the picture and recording being correlated in any desired manner. If desired, the picture may be a component of a pattern on the outside of the perforated panel. The novel assembly also preferably comprises a pair of properly colored eyeglasses mounted inside or outside of the container and utilized to view the picture if the latter is stereoscopic in character. Another feature of the invention is the provision of a center hole in the disc by perforations therethrough, in order to avoid a hole in the picture on the outside surface of the disc prior to removal thereof from the box panel.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claim.

What is claimed as new and desired to be secured by Letters Patent of the United States is as follows:

A container assembly comprising a box having a front panel, perforations through said panel defining a disc, a phonograph recording on the inner surface of said disc, a pattern on the outer side of said front panel partly formed by a component on the disc and partly formed by at least one component spaced from the disc, said first-mentioned component being stereoscopic in character, and a pair of eyeglasses mounted in a wall of said box, a portion of said wall including said glasses being defined by perforations for removal therefrom for viewing said first-mentioned component, said glasses being properly colored so that said first-mentioned component, when viewed through said glasses, appears to have three-dimensional characteristics.

References Cited in the file of this patent

UNITED STATES PATENTS

| | | |
|---|---|---|
| 1,479,794 | Emerson | Jan. 8, 1924 |
| 1,533,437 | Macy | Apr. 14, 1925 |
| 2,020,381 | Labowitz et al. | Nov. 12, 1935 |
| 2,025,352 | Lemon | Dec. 24, 1935 |
| 2,116,411 | Philipson | May 3, 1938 |
| 2,322,393 | Richardson | June 22, 1943 |